US012789979B2

(12) United States Patent
Clark

(10) Patent No.: US 12,789,979 B2
(45) Date of Patent: Nov. 10, 2026

(54) INTERFACE FOR WING FOLDING MECHANISM OF AN AIRCRAFT

(71) Applicant: Airbus Operations Limited, Bristol (GB)

(72) Inventor: Timothy Clark, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 19/091,063

(22) Filed: Mar. 26, 2025

(65) Prior Publication Data

US 2025/0304242 A1 Oct. 2, 2025

(30) Foreign Application Priority Data

Mar. 28, 2024 (GB) ...................................... 2404582

(51) Int. Cl.
*B64C 13/34* (2006.01)
*B64C 3/56* (2006.01)

(52) U.S. Cl.
CPC ................ *B64C 13/34* (2013.01); *B64C 3/56* (2013.01)

(58) Field of Classification Search
CPC . B64C 13/34; B64C 3/56; B64C 3/546; F16C 11/045; F16C 11/04
See application file for complete search history.

(56) References Cited

U.S. PATENT DOCUMENTS 4,721,016 A * 1/1988 Burandt .................... F16H 1/46 475/342
4,979,700 A 12/1990 Tiedeman et al.
5,558,299 A * 9/1996 Veile ......................... B64C 3/56 244/3.28

FOREIGN PATENT DOCUMENTS

CN 106184711 A 12/2016
CN 112109878 B 12/2020
CN 113108036 A 7/2021
EP 2691296 B1 1/2014

OTHER PUBLICATIONS

European Search Report corresponding to EP 25166782, dated May 30, 2025, 12 pages.
Search Report and Examination Report corresponding to GB 2404582.5, dated Sep. 25, 2024, 7 pages.

* cited by examiner

*Primary Examiner* — Ashesh Dangol
(74) *Attorney, Agent, or Firm* — Sterne, Kessler, Goldstein & Fox P.L.L.C.

(57) ABSTRACT

An interface for a wing folding mechanism of an aircraft. The interface has a central region comprising an internal surface, the internal surface being suitable for engaging a driven gear of a rotary actuator, and an attachment pad extending away from the central region in a first direction for attaching a surface to the interface. The interface can be used as part of the casing of a Geared Rotary Actuator. Also described are related wing assemblies, and aircraft and related methods.

18 Claims, 6 Drawing Sheets

INTERFACE FOR WING FOLDING MECHANISM OF AN AIRCRAFT

BACKGROUND OF THE INVENTION

The present invention concerns wing folding mechanisms. More particularly, but not exclusively, this invention concerns interface for a wing folding mechanism of an aircraft. The invention also concerns an aircraft joint, a casing for a Geared Rotary Actuator, a power hinge, a wing assembly, an aircraft and related methods.

There is a trend towards increasingly large passenger aircraft, for which it is desirable to have correspondingly large wing spans. However, the maximum aircraft span is effectively limited by airport operating rules which govern various clearances required when manoeuvring around the airport, such as the span and/or ground clearance required for gate entry and safe taxiway usage.

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

CN106184711 (NORTHWESTERN POLYTECHNICAL UNIVERSITY) discloses a wing folding mechanism of a morphing aircraft, and belongs to the field of aircraft wing mechanisms. This document disclosures a plurality of lugs for connecting a rotary actuator to inner and outer reinforcing ribs which connect to inner and outer wing sections to allow the wing to fold.

As used herein, a lug is a fitting comprising one or more plates, arranged to receive one or more shear bolts such that loads are transmitted from the shear bolts to the plates in a direction parallel to the planar faces of the plates.

However, mounting the inner and inner and outer wing sections to allow the wing to fold using lugs in this way relies on a small area of contact surface between the lugs and shear bolts to transfer the load. The forces experienced on such joints from bending moments can be high.

The present invention seeks to mitigate one or more of the above-mentioned problems. Alternatively or additionally, the present invention seeks to provide an improved: interface for a wing folding mechanism of an aircraft, aircraft joint, casing for a power hinge, power hinge, wing assembly, and aircraft and related methods.

SUMMARY OF THE INVENTION

The present invention provides according to a first aspect, an interface for a wing folding mechanism of an aircraft, the interface comprising a central region comprising an internal surface, the internal surface being suitable for engaging a driven gear of a rotary actuator, and an attachment pad extending away from the central region in a first direction.

The attachment pad may be for attaching a surface to the interface. The attachment pad may comprise an attachment surface. The attachment surface may be a planar surface configured to transmit or receive load in a direction perpendicular to the plane of the attachment surface. The load transmitted or received or received may be a compressive load or a tensile load.

Use of an attachment pad may allow for more efficient transfer of load, over a greater area, when compared to prior art interfaces for a wing folding mechanism of an aircraft, such as interfaces that rely solely on lugs. The ability for the attachment pad to be of greater area than a corresponding lug fitting therefore allows for a more efficient load transfer at the interface. Use of an attachment pad in this way also vastly reduces the possibility of bolt bending failure modes at the interface, when compared to the use of lugs.

The central region may define an axis of rotation that is perpendicular to the first direction and that passes through the centroid of the internal surface, wherein the attachment pad comprises an attachment surface that is substantially perpendicular to the first direction and that extends in a direction parallel to the axis of rotation.

The attachment surface is configured to receive compressive load in a second direction that is substantially opposite to the first direction.

The attachment surface may comprise a hole configured to receive a tension bolt. The hole may be arranged such that the longitudinal axis of a tension bolt fitted to the hole is substantially parallel to the first direction.

The attachment surface may comprise a first access opening, wherein the first access opening comprises a cut out region providing access to a space for receiving a nut or bolt behind the attachment surface. This improves the speed at which bolts and or nuts can be fitted behind the attachment surface, and allows for ease of maintenance.

The first access opening may have a length and width associated with it. The length and width of the first access opening may define a plane. The plane defined by the length and width of the first access opening may extend in a direction substantially parallel to the first direction. This improves the case with which the bolt and/or nut located behind the attachment surface can be accessed. There may be a second access opening. The second access opening may have a length and width associated with it. The length and width of the second access opening may define a plane. The plane defined by the length and width of the second access opening may extend in a direction substantially parallel to the first direction. This further improves the case with which the bolt and/or nut located behind the attachment surface can be accessed. The first and/or second access opening may be configured such that a barrel nut can be mounted and/or replaced behind the attachment surface by access provided by the first or second access opening. The case of replaceability of nuts provided by the access openings improves the speed of assembly and case of maintenance of connections to the interface.

The attachment pad may comprise or be configured to receive a removable nut behind the hole. The removable nut may therefore be or be configured to be on the side of the attachment surface that is closer to the central region of the interface. The removable nut may be or be configured to be on the side of the attachment surface that is closest to the central region of the interface. The removable nut may be a standard nut, a locking nut, or preferably a barrel nut. The barrel nut may be mounted or be configured to be mounted behind the attachment surface. The barrel nut may therefore be mounted or be configured to be mounted on the side of the attachment surface that is closer to the central region of the interface. The standard nut, a locking nut, or barrel nut may be accessible or be configured to be accessible from the any of the first or second access openings, such that the standard nut, a locking nut, or barrel nut can be replaced.

As an alternative to a nut or a region configured to receive a nut, the attachment pad may comprise a threated region behind the hole, the threaded region being capable of receiving a tension bolt.

The interface may further comprise a lug extending away from the central region in the first direction. It may be advantageous for a lug to be present such that the interface can be rotated into position about the lug during assembly of the wing folding mechanism.

As previously mentioned, the central region may define an axis of rotation that is perpendicular to the first direction and that passes through the centroid of the internal surface. The attachment pad and lug may be arranged such that a first axis that is perpendicular to both the first direction and the axis of rotation but which does not pass through the axis of rotation passes thorough both the attachment pad and the lug. The attachment pad and lug may therefore be on the same side of the central region, and therefore the same side of the rotary actuator and internal gearing, optionally such that the attachment pad and lug may be configured to be mounted to the same a mounting structure, for example a fixed or movable part of a wing.

The interface may comprise a further attachment pad extending away from the central region in a first direction. The further attachment pad may have any of the features previously described in relation to the attachment pads. The interface may comprise any number of further attachment pads extending away from the central region in a first direction.

As previously mentioned, the central region may define an axis of rotation that is perpendicular to the first direction and that passes through the centroid of the internal surface. The attachment pad and further attachment pad may be arranged such that a first axis that is perpendicular to both the first direction and the axis of rotation, but which does not pass through the axis of rotation, passes thorough both the attachment pad and the further attachment pad. The attachment pad and further attachment pad may therefore be on the same side of the central region, and therefore the same side of the rotary actuator and internal gearing, optionally such that the attachment pad and further attachment pad may be configured to be mounted to the same a mounting structure, for example a fixed or movable part of a wing.

As previously mentioned, the central region may define an axis of rotation that is perpendicular to the first direction and that passes through the centroid of the internal surface. The interface may comprise one or more open end(s), whereby the axis of rotation passes through the open end(s). Parts of an internal gearing may then access a drive unit, for example, a motor or gear, or both a motor and a gear, or the gearing of an adjacent interface through the open end(s).

The interface may comprise an internal gearing comprising, for example, a rotary gear, or part of a rotary gear mechanism. The rotary gear mechanism may comprise a driven gear. The driven gear may comprise one or more planetary gears. The internal surface may comprise a toothed surface for engaging a driven gear of a rotary actuator.

Advantageously, the interface may react flight loads in a structurally efficient way. For example, if the interface forms part of a wing with a folding wing tip, the attachment pad may be configured to provide a relatively large surface area of transmitting wing up-bending loads. A tension bolt extending through the attachment pad may carry a wing down-bending load in the most efficient structural direction. Alternatively or additionally, the structural efficiency of the attachment pad may enable a smaller and/or lighter interface to be provided. This may reduce the weight of an aircraft including the interface, and/or reduce the packaging requirements, both of which may improve the efficiency of the aircraft.

According to a second aspect of the invention there is also provided a joint, the aircraft joint comprising an interface for a wing folding mechanism as described in accordance with the first aspect of the invention, and a mounting structure, wherein a first portion of the mounting structure is mounted to the attachment pad. The mounting structure may be part of a fixed wing portion or part of a movable wing portion.

The interface may further comprise a lug extending away from the central region in a first direction, the lug having any features as previously described in relation to the interface of the first aspect of the invention wherein a second portion of the mounting structure, for example, part of the fixed wing portion or part of the movable wing portion, is mounted to the lug. The interface may comprise any number of further lugs extending away from the central region in a first direction.

According to a third aspect of the invention there is also provided a casing for a Geared Rotary Actuator for a wing folding mechanism, the casing comprising a first interface for a wing folding mechanism of an aircraft, the first interface comprising: a central region comprising an internal surface, the internal surface being suitable for engaging a driven gear of a rotary actuator, and a first attachment pad extending away from the central region of the first interface in a first direction. A Geared Rotary Actuator may also be known as a Power Hinge, and in the context of disclosure of this patent application the terms are to be considered to be interchangeable.

The first interface may have any features described in accordance with the first aspect of the invention.

The casing may further comprise a second interface for a wing folding mechanism of an aircraft, the second interface comprising: a central region comprising an internal surface, the internal surface being suitable for engaging a driven gear of a rotary actuator, and a second attachment pad extending away from the central region of the second interface in a second direction, the second direction being substantially opposite to the first direction.

The second interface may have any features described in accordance with the first aspect of the invention.

The first attachment pad may be configured to be mounted to a first mounting structure and the second attachment pad may be configured to be mounted to a second mounting structure. The first mounting structure may be a part of a fixed portion of an aircraft wing and the second portion may be a part of a movable portion of an aircraft wing or vice versa.

It may be that the first and second interfaces are arranged such that there is an axis of rotation that is perpendicular to the first direction and second direction and that passes through the centroid of the internal surface of the first interface and the centroid of the internal surface of the second interface.

It may be that the first interface comprises one or more open end(s), whereby the axis of rotation passes through said open end(s) of the first interface and, wherein the second interface comprises one or more open end(s), whereby the axis of rotation passes through the open end(s) of the second interface. This may allow one or more parts of an internal gearing to pass through the central region and/or engage with the internal surface of the of the first interface and/or second interface.

According to a fourth aspect of the invention there is also provided a Geared Rotary Actuator for a wing folding mechanism comprising a casing as described in accordance with the third aspect of the invention and an internal gearing, the internal gearing comprising a driven gear configured to engage with at least the internal surface of the first interface.

According to a fifth aspect of the invention there is provided a wing assembly for a folding wing, the wing assembly comprising a casing for a Geared Rotary Actuator for a wing folding mechanism, the casing being as described in accordance with the third aspect of the invention, wherein the second interface is configured to rotate relative to the first interface about an axis of rotation that is perpendicular to the first direction and second direction and that passes through the centroid of the internal surface of the first interface and the centroid of the internal surface of the second interface, and wherein a fixed wing portion is mounted to the first attachment pad and a movable wing portion is mounted to the second attachment pad such that the movable wing portion is configured to rotate relative to the fixed wing portion by rotation of the second interface relative to the first interface about the axis of rotation.

The wing assembly may further comprise an internal gearing, the internal gearing comprising a driven gear configured to engage with at least the internal surface of the second interface. The internal gearing may have any of the features previously described in relation to internal gearing described with reference to other aspects of the invention.

According to a sixth aspect of the invention there is provided method of attaching a mounting structure to an interface for a wing folding mechanism of an aircraft, the method comprising the steps of: providing an interface for a wing folding mechanism of an aircraft according to the first aspect of the invention and attaching the mounting structure to the attachment pad of the interface.

According to a seventh aspect of the invention there is provided a method of manufacturing a wing assembly, the method comprising proving a casing for a Geared Rotary Actuator for a wing folding mechanism, as described in accordance with the fifth aspect of the invention, wherein the second interface is configured to rotate relative to the first interface about an axis of rotation that is perpendicular to the first direction and second direction and that passes through the centroid of the internal surface of the first interface and the centroid of the internal surface of the second interface, and wherein the method further comprises mounting a fixed wing portion to the first attachment pad and a movable wing portion to the second attachment pad such that the movable wing portion can rotate relative to the fixed wing portion by rotation of the second interface relative to the first interface about the axis of rotation.

According to an eighth aspect of the invention there is provided an aircraft comprising an interface according to the first aspect of the invention, an aircraft joint according to the second aspect of the invention, a casing according to a third aspect of the invention, a Geared Rotary Actuator according to a fourth aspect of the invention and/or a wing assembly according to a fifth aspect of the invention.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

A Geared Rotary Actuator according to a fourth aspect of the invention and/or a wing assembly according to a fifth aspect of the invention may be configured to effect the movement of a movable wing portion between a first configuration and a second configuration. The first and second configurations may correspond to flight configurations e.g. to adjust the wing in relation to flight loads or ground configurations e.g. to adjust the overall wing length during or before taxiing or any combination thereof.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
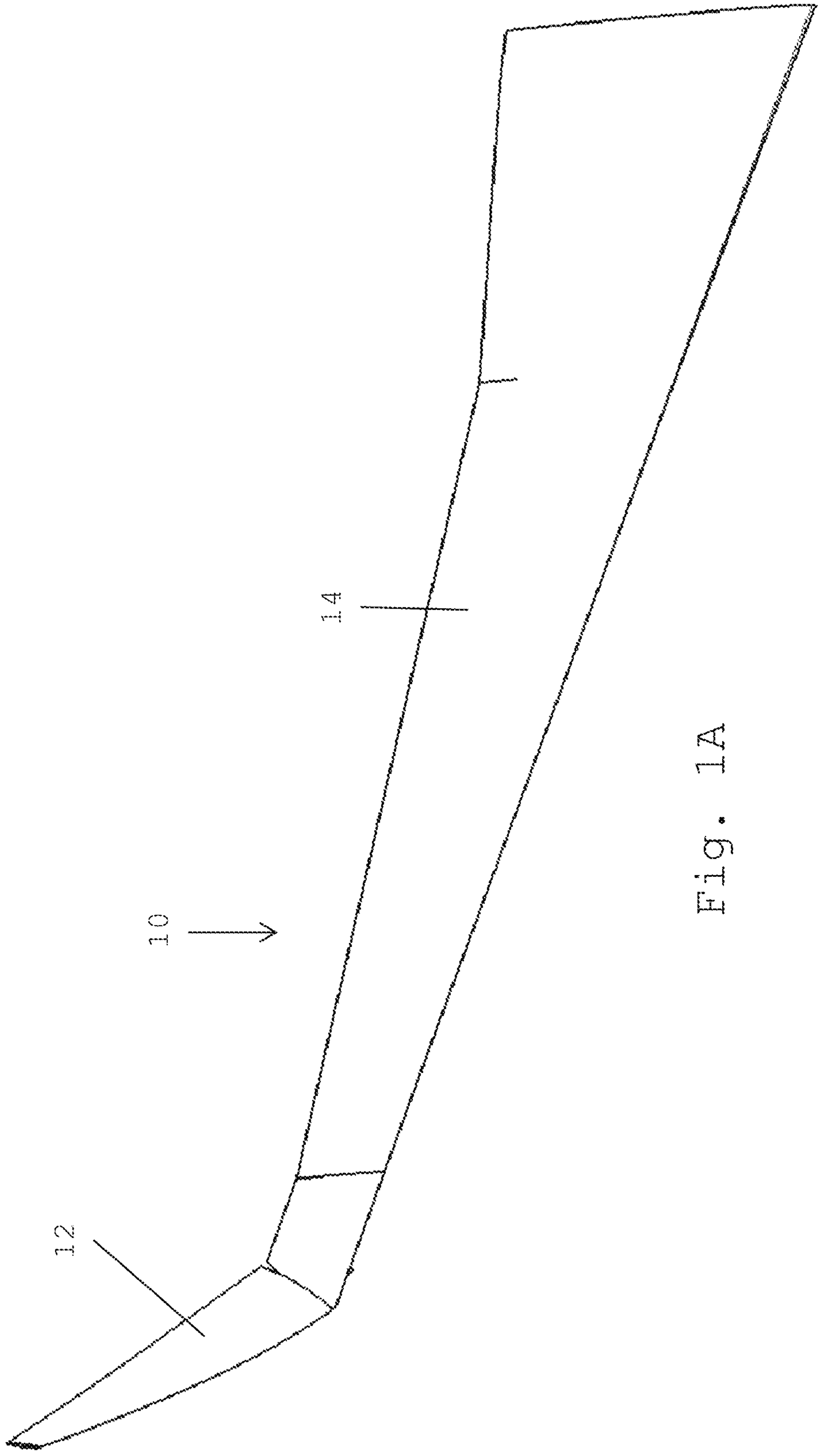
FIG. 1A shows a schematic view of an aircraft wing according to a first embodiment of the invention.
Figure 1B:
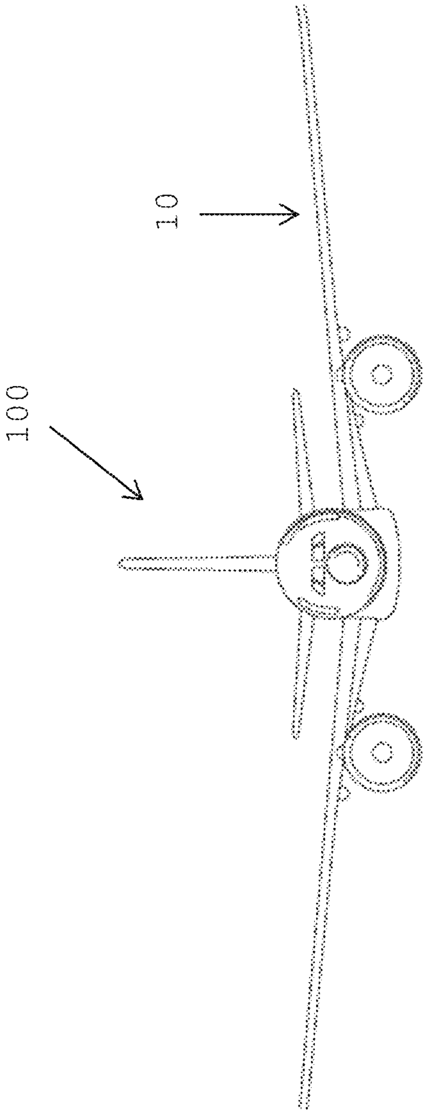
FIG. 1B shows a schematic view of an aircraft according to a second embodiment of the invention.

FIG. 1A shows a wing 10 comprising a wing tip device 12 and a fixed wing 14. FIG. 1B shows an aircraft 100 comprising the wing 10. The wing tip device 12 is configurable between: (i) a first configuration, as shown in FIG. 1B and (ii) a second configuration, as shown in FIG. 1A, in which second configuration the wing tip device 12 is moved, by rotation, away from the flight configuration such that the span of the aircraft wing 10 is reduced. The first and second configuration may correspond to a flight configuration and a ground configuration respectively, though the configurations may instead correspond to two different in-flight configurations and/or two different ground configurations. To move the wing between the flight configuration(s) and/or the ground configuration(s), a Geared Rotary Actuator 200, not shown in FIG. 1A or FIG. 1B, is used to move the wing tip device between the first and second configurations, the Geared Rotary Actuator also joining the wing tip device 12 to the fixed wing 14.

Figure 2:
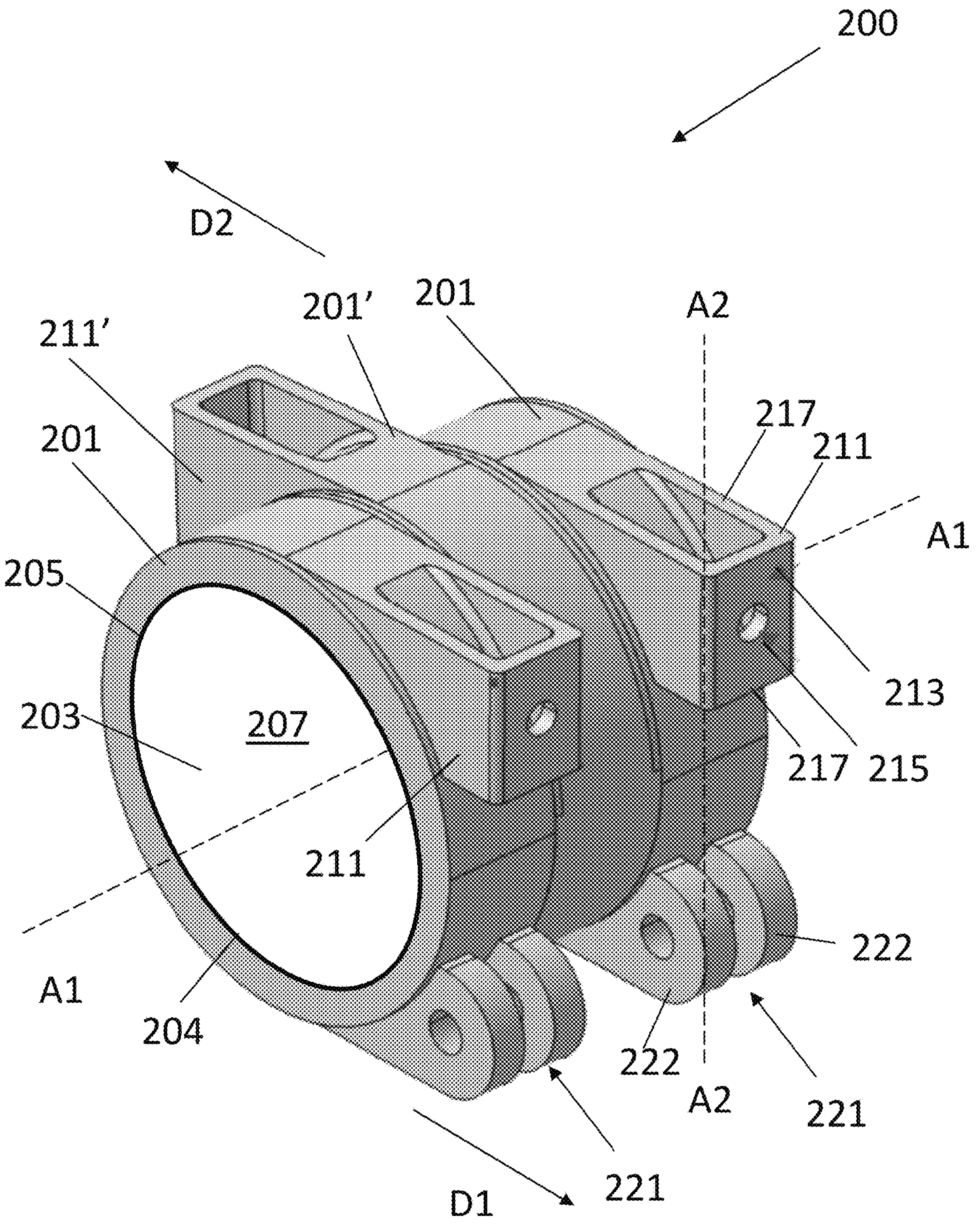
FIG. 2 shows a schematic view of a Geared Rotary Actuator according to an embodiment of the invention and FIG. 3 shows a schematic view of an aircraft joint according to an embodiment of the invention embodiment of the invention.

A Geared Rotary Actuator 200 according to an embodiment of the invention is shown in FIG. 2. The Geared Rotary Actuator comprises a plurality of interface portions 201 and 201'. Each interface portion 201 may be know as a "slice" in the field. Each interface portion 201 has central region 203, open ends 204 and an inner surface 205. The inner surface 205 is configured to engage with a internal gearing 207 that runs through the central region of each interface portion 201, so that the internal gearing 207 can rotate the inner surface of the interface portion 205. The internal gearing 207 comprises a plurality of planetary gears. Such arrangements are conventional in the aerospace industry and the skilled person would be well aware of such mechanisms. Therefore, the internal components of the internal gearing are not shown to improve clarity of the figures. The internal gearing 207 defines an axis of rotation A1 around which the interface portion 201 may be rotated by the rotary actuator. The axis A1 passes through the centroid of the internal surface 205. The open ends 204 allow the internal gearing 207 to pass through multiple interface portions 201 and access and engage the internal surface 207 of those portions 201. The open end 204, as used herein, refers to an end which is open to the extent required to interface with an internal gear of an adjacent slice, or open to the extent that it can receive transmission from an external drive unit such as a motor or gearbox. It does not necessarily imply that an end is open to the extent that any of the internal surfaces and/or internal gears are exposed to the elements while in use on an aircraft.

Each interface portion 201 comprises an attachment pad 211 having an attachment surface 213. The attachment pad 211 extends away from the central region 203 in a first direction D1. The attachment surface 213 extends in a plane that is perpendicular to the first direction D1, the plane extending in a direction that is parallel to the axis of rotation A1. The attachment surface 213 is configured to receive compressive load in a second direction D2 that is substantially opposite to the first direction D1. The attachment surface 213 has a hole 215 that is sized such that it can receive a tension bolt. The attachment pad 211 also comprises two access openings 217. Only the upper opening is visible in the drawing. The access openings 217 allow fixings, for example nuts and/or tension bolts, to be fitted behind the attachment surface 213. The access length and width of the access openings 217 define a plane that extends in a direction substantially parallel to the first and second directions D1, D2.

Each interface portion 201 also comprises a lug 221 extending away from each interface portion 201 in the first direction D1. The attachment pad 211 and lug are arranged above and below each other as shown in FIG. 2, though it will be appreciated that these positions relative to the vertical will change during the use of the Geared Rotary Actuator 200. An axis A2 that is perpendicular to both the first direction D1 and second direction D2 and the axis of rotation A1 passes thorough both the attachment pad 211 and the lug 222. The attachment pad 211 and lug 221 are therefore on the same side, when viewed down the rotation axis, of the central region 203 and internal gearing 201. Each lug 221 comprises two plates 222, arranged to receive one or more shear bolts such that loads are transmitted from the shear bolts to the plates 222 in a direction parallel to the planar faces of the plates.

The Geared Rotary Actuator 200 is arranged such that an interface portion 201 is mounted adjacent to a mirror image interface portion 201', where the mirror image interface portion 201' is as previously described with relation to the interface portion 201, with the first and second directions reversed. See for example how the mirror attachment pad 211' extends in the second direction. The mirror interface portion 201' is mounted adjacent to a further interface portion 201.

An embodiment of the invention may relate to a casing for a power hinge. A casing for a Geared Rotary Actuator refers to the Geared Rotary Actuator 200 showing in FIG. 2, without the rotary 207 actuator present or installed in the casing.

Figure 3:
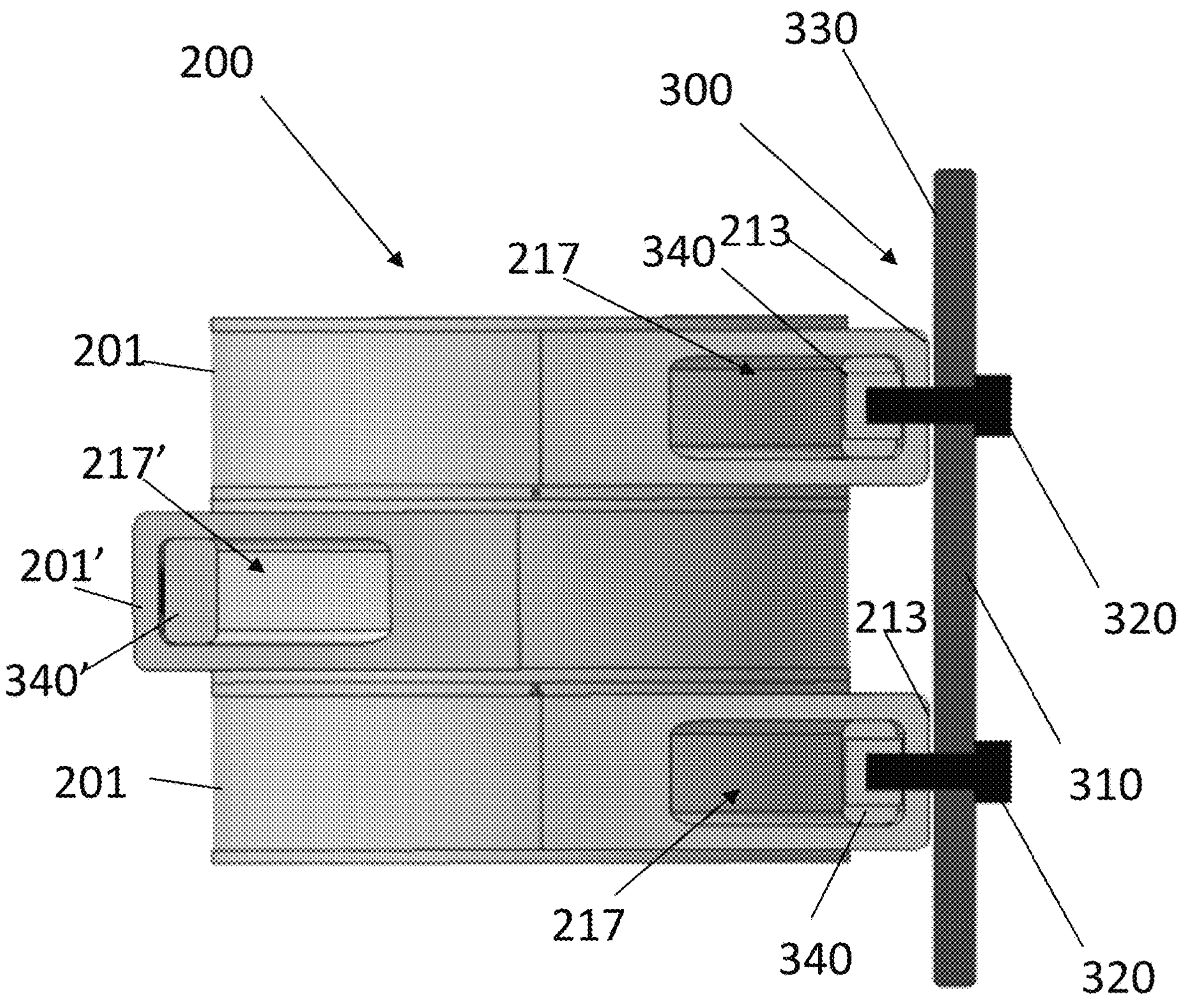
Figure 4:
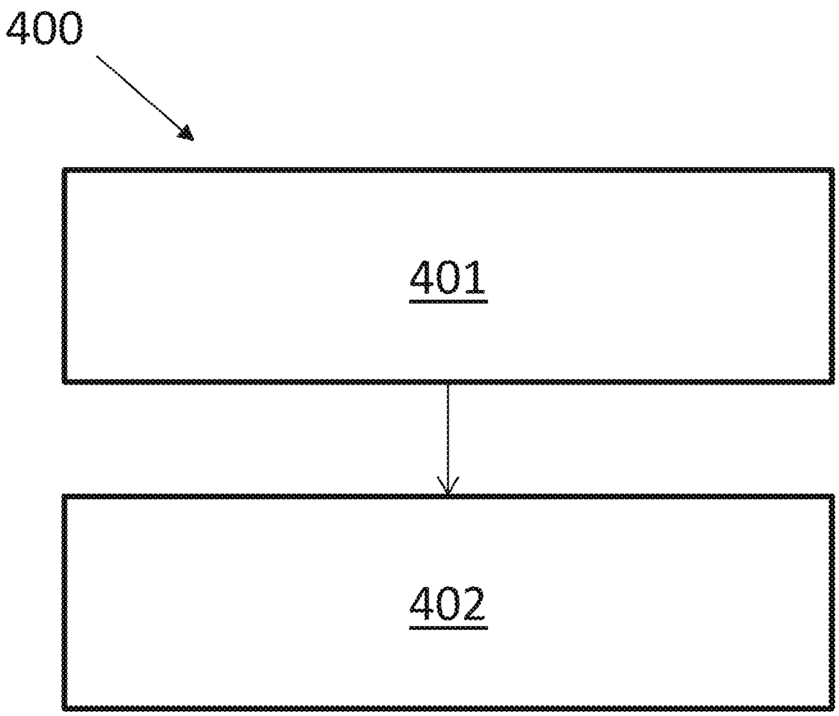
FIG. 4 is a flow diagram illustrating a method according to an embodiment of the invention.
Figure 5:
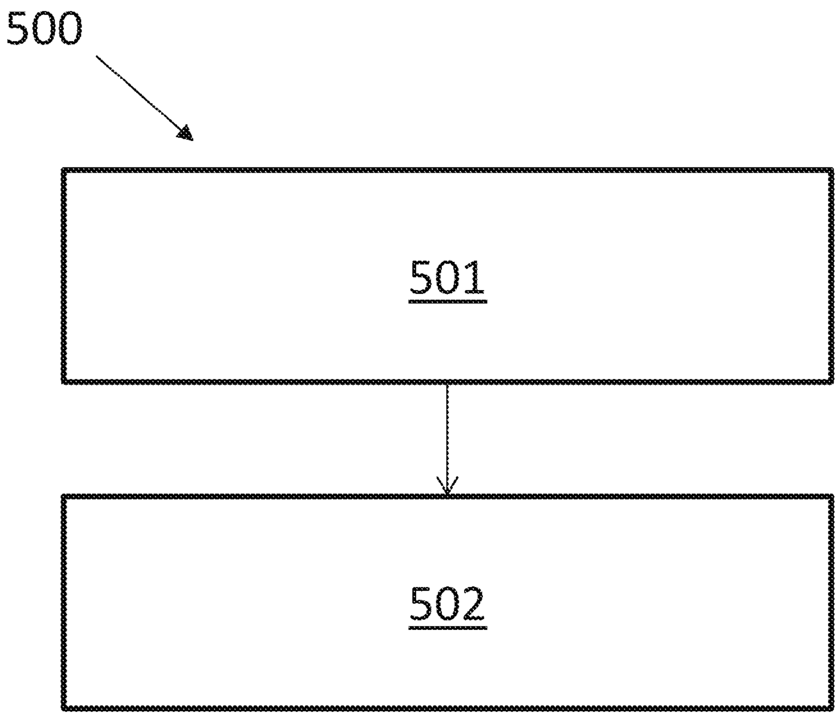
FIG. 5 is a flow diagram illustrating a method according to an embodiment of the invention.

FIG. 3 shows the Geared Rotary Actuator 200 of FIG. 2 as part of an aircraft joint 300. Each of the interface portions 201 are mounted to a mounting structure 310 by a tension bolt 320 threaded through holes 215 in the attachment surface 213. The tension bolt 320 holds the attachment surfaces 213 to a surface 330 of the mounting structure 310 under tension. Each tension bolt 320 is connected to a nut 340 that is mounted behind the attachment surface 213, and that is accessible and replaceable through the access openings 217. The mirror attachment pad 211' has a nut 340' attached to it visible through access opening 217' and ready to receive a further tension bolt for mounting the mirror interface portion 201 to a mounting structure.

The mounting structure 310 may for example be a part of a fixed wing of a wing. A movable wing tip device may be mounted to the mirror interface portion 201'. By engaging the internal gearing 207, the movable wing tip device may be rotated relative to the fixed wing by rotating the mirror interface portion 201' relative to the interface portions 201' about the axis of rotation A1.

According to an embodiment of the invention there is provided a method 400 of attaching a mounting structure to an interface for a wing folding mechanism of an aircraft, the method comprising the steps of providing 401 an interface for a wing folding mechanism of an aircraft as claimed in any of claims 1 to 12 and attaching 402 the mounting structure to the attachment pad of the interface.

According to an embodiment of the invention there is provided a method 500 of manufacturing a wing assembly, the method comprising: providing 501 a casing for a Geared Rotary Actuator for a wing folding mechanism as previously described, wherein the second interface is configured to rotate relative to the first interface about an axis of rotation that is perpendicular to the first direction and second direction and that passes through the centroid of the internal surface of the first interface and the centroid of the internal surface of the second interface, and wherein the method further comprises mounting 502 a fixed wing portion to the first attachment pad and a movable wing portion to the second attachment pad such that the movable wing portion can rotate relative to the fixed wing portion by rotation of the second interface relative to the first interface about the axis of rotation.

The configurations shown in FIG. 2 and FIG. 3 may corresponded to a Geared Rotary Actuator 200 in a flight configuration.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiments shown in FIG. 2 and FIG. 3, there are lugs 221. In other embodiments, there may be a further attachment pad, in place of the lugs.

In the embodiments shown in FIG. 2 and FIG. 3 the nuts are located behind the attachment surface 213 and the bolts are located on the side of the attachment surface further away from the central region 203. However, the location of the nuts and bolts may be reversed in other embodiments.

In the embodiments shown in FIG. 2 and FIG. 3 the nuts 340 are standard nuts. However, the nut may be a barrel nut in other embodiments. The skilled person would readily appreciate how to modify the attachment pads such that a barrel nut can be mounted to it, for example by providing a cylindrical region configured to receive the barrel nut. Additionally, the skilled person would be well aware of how to modify embodiments described herein such that locking nuts or a threaded region, for example a threaded housing integrally formed with the attachment pad, can be used in place of standard nuts.

In the embodiments shown in FIG. 2 and FIG. 3, the Geared Rotary Actuator comprises more than one interface portion. However, the skilled person will appreciate that in some embodiments that a Geared Rotary Actuator may comprise only one interface portion.

In the embodiments shown in FIG. 2 and FIG. 3, the interface portion of the Geared Rotary Actuator has an "open end" as defined herein; however, in other embodiments, the open end(s) may be closed for at least one of the interface portions.

In the embodiment shown in FIG. 3, the interface portion 201 and the mirror interface portion 201' are shown to be only three in number (in total). The skilled person would realise that in other embodiment of the invention, a Geared Rotary Actuator having many more interface portions 201 and the mirror interface portions 201'would be envisioned.

In the embodiment shown in FIG. 3, the interface portion 201 and the mirror interface portion 201' are shown to take an alternating pattern, with one interface portion 201 followed by one mirror interface portion 201 alternating along the length of the rotation axis A1. The skilled person would realise that in other embodiment of the invention, a Geared Rotary Actuator a different configuration, for example several interface portions 201 followed by several mirror interface portion 201' would be envisioned.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An interface for a wing folding mechanism of an aircraft, the interface comprising:

a central region comprising an internal surface, the internal surface engaging a driven gear of a rotary actuator, the central region defining an axis of rotation that is perpendicular to a first direction and that passes through a centroid of the internal surface, an attachment pad extending away from the central region in the first direction, the attachment pad comprising an attachment surface that is substantially perpendicular to the first direction and that extends in a direction parallel to the axis of rotation, the attachment surface comprising an attachment surface hole configured to receive an attachment surface bolt, and a lug extending away from the central region in the first direction, the lug comprising a lug hole to receive a lug bolt, the lug hole being oriented substantially perpendicular to the attachment surface hole.

2. The interface as claimed in claim 1, wherein the attachment surface is configured to receive compressive load in a second direction that is substantially opposite to the first direction.

3. The interface as claimed in claim 1, wherein the attachment pad comprises a first access opening, wherein the first access opening comprises a cut out region providing access to a space for receiving a nut or the attachment surface bolt.

4. The interface as claimed in claim 3, wherein a plane defined by a length and a width of the first access opening extends in a direction substantially parallel to the first direction.

5. The interface as claimed in claim 1, wherein the attachment pad comprises a removable nut behind the attachment surface hole, the nut being configured to receive the attachment surface bolt.

6. The interface as claimed in claim 1, wherein the attachment pad comprises a threaded region behind the attachment surface hole, the threaded region being capable of receiving the attachment surface bolt.

7. The interface as claimed in claim 1, wherein,:

the attachment pad and the lug are arranged such that an axis that is perpendicular to both the first direction and the axis of rotation passes thorough both the attachment pad and the lug.

8. The interface as claimed in claim 1, wherein the interface comprises one or more open ends, whereby the axis of rotation passes through the one or more open ends.

9. An aircraft joint, the aircraft joint comprising the interface for a wing folding mechanism as claimed in claim 1, and a mounting structure, wherein a first portion of the mounting structure is mounted to the attachment pad, wherein a second portion of the mounting structure is mounted to the lug.

10. A method of attaching a mounting structure to an interface for a wing folding mechanism of an aircraft, the method comprising steps of:

providing the interface for a wing folding mechanism of an aircraft as claimed in claim 1;

attaching the mounting structure to the attachment pad of the interface.

11. An aircraft comprising:

the interface as claimed in claim 1.

12. A casing for a Geared Rotary Actuator for a wing folding mechanism of an aircraft, the casing comprising:

a first interface for the wing folding mechanism, the first interface comprising:

a central region comprising an internal surface, the internal surface engaging a driven gear of a rotary actuator, a first attachment pad extending away from the central region of the first interface in a first direction, the first attachment pad comprising a first attachment surface that is substantially perpendicular to the first direction and that extends in a direction parallel to an axis of rotation defined by the central region, the first attachment surface comprising a first attachment surface hole configured to receive a first attachment surface bolt, and a first lug extending away from the central region in the first direction, the first lug comprising a first lug hole to receive a first lug bolt, the first lug hole being oriented substantially perpendicular to the first attachment surface hole; and a second interface for the wing folding mechanism of the aircraft, the second interface comprising:

a central region comprising an internal surface, the internal surface being suitable for engaging the driven gear of the rotary actuator, the axis of rotation passing through the central region of the second interface, and a second attachment pad extending away from the central region of the second interface in a second direction substantially opposite to the first direction.

13. The casing for a Geared Rotary Actuator for a wing folding mechanism as claimed in claim 12, wherein the first and second interfaces are arranged such that the axis of rotation is perpendicular to the first direction and the second direction, and passes through a centroid of the internal surface of the first interface and a centroid of the internal surface of the second interface.

14. The casing for a Geared Rotary Actuator for a wing folding mechanism as claimed in claim 13, wherein the first interface comprises one or more open ends, whereby the axis of rotation passes through said one or more open ends of the first interface, and wherein the second interface comprises one or more open ends, whereby the axis of rotation passes through the one or more open ends of the second interface.

15. The casing for a Geared Rotary Actuator for a wing folding mechanism as claimed in claim 12, wherein the rotary actuator comprises the driven gear configured to engage with at least the internal surface of the first interface.

16. A wing assembly for a folding wing, the wing assembly comprising the casing for a Geared Rotary Actuator for a wing folding mechanism of an aircraft, as claimed in claim 12, wherein the second interface is configured to rotate relative to the first interface about the axis of rotation that is perpendicular to the first direction and the second direction, and that passes through a centroid of the internal surface of the first interface and a centroid of the internal surface of the second interface, and wherein a fixed wing portion is mounted to the first attachment pad and a movable wing portion is mounted to the second attachment pad such that the movable wing portion is configured to rotate relative to the fixed wing portion by rotation of the second interface relative to the first interface about the axis of rotation.

17. The wing assembly as claimed in claim 16, wherein the driven gear of the rotary actuator is configured to engage with at least the internal surface of the second interface.

18. A method of assembling a wing assembly, the method comprising providing the casing for a Geared Rotary Actuator for a wing folding mechanism, as claimed in claim 12, wherein the second interface is configured to rotate relative to the first interface about the axis of rotation that is perpendicular to the first direction and the second direction, and that passes through a centroid of the internal surface of the first interface and a centroid of the internal surface of the second interface, and wherein the method further comprises mounting a fixed wing portion to the first attachment pad and a movable wing portion to the second attachment pad such that the movable wing portion can rotate relative to the fixed wing portion by rotation of the second interface relative to the first interface about the axis of rotation.

* * * * *